US006278006B1

(12) United States Patent
Kodali et al.

(10) Patent No.: US 6,278,006 B1
(45) **Date of Patent: *Aug. 21, 2001**

(54) TRANSESTERIFIED OILS

(75) Inventors: Dharma R. Kodali, Plymouth; Scott C. Nivens, New Hope, both of MN (US)

(73) Assignee: Cargill, Incorporated, Wayzata, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,617

(22) Filed: Jan. 19, 1999

(51) Int. Cl.[7] .......... C09F 7/00
(52) U.S. Cl. .......... 554/30; 554/24; 554/169; 426/601; 508/491
(58) Field of Search .......... 554/169, 24, 30; 508/491; 426/601

(56) References Cited

U.S. PATENT DOCUMENTS

| | | | |
|---|---|---|---|
| 4,144,183 | 3/1979 | Koch et al. | 252/56 S |
| 4,448,700 | 5/1984 | Lankamp | 252/12.4 |
| 4,627,192 | 12/1986 | Fick | 47/58 |
| 4,783,274 | 11/1988 | Jokinen et al. | 252/32.7 |
| 4,832,975 | 5/1989 | Yang . | |
| 5,258,197 | 11/1993 | Wheeler et al. . | |
| 5,282,989 | 2/1994 | Erickson et al. | 252/48.2 |
| 5,346,724 | 9/1994 | Ohgake et al. | 427/384 |
| 5,413,725 | 5/1995 | Lal et al. | 252/18 |
| 5,451,334 | 9/1995 | Bongardt et al. | 252/56 R |
| 5,549,836 | 8/1996 | Moses | 508/183 |
| 5,589,217 | 12/1996 | Mazurek . | |
| 5,716,916 | 2/1998 | Shiokawa et al. | 508/485 |
| 5,721,199 | 2/1998 | Moses | 508/183 |
| 5,767,338 | 6/1998 | Fan | 800/200 |
| 5,773,391 | 6/1998 | Lawate et al. | 508/257 |
| 5,861,187 | 1/1999 | Debonte et al. | 426/601 |

FOREIGN PATENT DOCUMENTS

| | | |
|---|---|---|
| 0 843 000 A1 | 5/1998 | (EP) . |
| WO 93/07240 | 4/1993 | (WO) . |
| WO 96/07632 | 3/1996 | (WO) . |
| WO 97/40698 | 11/1997 | (WO) . |

OTHER PUBLICATIONS

Kodali et al., "Molecular Packing in Triacyl–sn–Glycerols: Influences of Acyl Chain Length and Unsaturation", *J. Disp. Sci. Tech.*, 1989, 10(4 & 5):393–440.

(List continued on next page.)

*Primary Examiner*—Deborah D. Carr
(74) *Attorney, Agent, or Firm*—Fish & Richardson P.C.

(57) ABSTRACT

Oils containing a triacylglycerol polyol ester and a non-glycerol polyol ester are described, as well as methods of making such oils. Methods for improving lubrication properties of a vegetable oil also are described.

33 Claims, 7 Drawing Sheets

OTHER PUBLICATIONS

Kodali et al., "Synthesis and Polymorphism of 1,2–Dipalmitoyl–3–acyl–sn–glycerols", 1984, *Jaocs*, 61(6):1078–1084.

Kodali et al., "Polymorphic behavior of 1,2–dipalmitoyl–3–lauroyl(PP12)–and 3–myristoy(PP14)–sn–glycerols", *J. Lipid. Res.*, 1990, 31:1853–1864.

Kodali et al., "Molecular Packing of 1,2–Dipalmitoyl–3–decanoyl–sn–glycerol (PP10): Bilayer, Trialyer, and Hexalayer Structures", *J. Phys. Chem.*, 1989, 93(11):4683–4691.

Uosukainen et al., "Transesterification of Trimethylolpropanje and Rapeseed Oil Methyl Ester to Environmentally Acceptable Lubricants," *Journal of The American Oil Chemists Society*, vol. 75, No. 11, 1998, pp. 1557–1563.

Cvitkovic, "A Thin–Film Test for Measurement of the Oxidation and Evaporation of Ester–Type Lubricants", *ASLE Transactions*, 1978, 22(4):395–401.

McVetty et al., "Venus high erucic acid, low glucosinolate summer rape", *Can. J. Plant Sci.*, 1996, 76(2):341–342.

McVetty et al., "Neptune high erucic acid, low glucosinolate summer rape", *Can. J. Plan Sci.*, 1996, 76(2):343–344.

Scarth et al., "Mercury high erucic low glucosinolate summer rape", *Can. J. Plant Sci.*, 1995, 75(1):205–206.

Asadauskas et al., "Oxidative Stability and Antiwear Properties of High Oleic Vegetable Oils", *J. Soc. Tribologists Lubrication Engineers*, 1995, 52(12):877–882.

TRANSESTERIFIED OILS

TECHNICAL FIELD

The invention relates to oils transesterified with short-chain fatty acid esters, and having improved lubrication properties.

BACKGROUND OF THE INVENTION

Oils used in industrial applications are typically petroleum based hydrocarbons that can damage the environment, as well as pose health risks to people using them. Plant oils are an environmentally friendly alternative to petroleum based products, and are based on renewable natural resources. The major components of plant oils are triacylglycerols (TAGs), which contain three fatty acid chains esterified to a glycerol moiety. The polar glycerol regions and non-polar hydrocarbon regions of TAGs are thought to align at the boundaries of metal surfaces, and thus have better lubricant properties than petroleum hydrocarbons.

The low temperature properties and oxidative stability of plant oils, however, limit their use for industrial applications. Industrial oils must be liquid and have a reasonable viscosity at low temperatures. Most plant oils do not possess such low temperature properties. For example, high erucic rapeseed oil has a pour point (i.e., the temperature at which the oil ceases to flow) of −16° C., but undergoes a significant increase in viscosity with decreasing temperatures.

Industrial oils also must have high oxidative stability, which generally is related to the degree of unsaturation present in the fatty acids. Reaction of a plant oil with oxygen can lead to polymerization and cross-linking of the fatty acids, and decreased oxidative stability. Saturated hydrocarbon based oils have no unsaturation and therefore have high oxidative stability.

SUMMARY OF THE INVENTION

The invention is based on transesterifyng short saturated fatty acid esters with triacylglycerol containing oils, such as vegetable oils, to obtain an oil having improved lubrication properties. Although vegetable oils are known to provide good boundary lubrication, their low oxidative stability and poor low temperature properties often prevent them from being utilized in lubrication applications. Transesterifying various short saturated fatty acid esters with a vegetable oil improves oxidative stability and low temperature properties due to the increased saturation and the heterogeneity of the fatty acids esterified to the polyols.

In one aspect, the invention features a method for improving lubrication properties of a vegetable oil. Lubrication properties can include wear properties, viscosity, or crystallization temperature. The method includes transesterifying the vegetable oil with a short chain fatty acid ester. The vegetable oil can have a monounsaturated fatty acid content of at least 50%, e.g., at least 70%, and can be selected from the group consisting of corn oil, rapeseed oil, soybean oil, and sunflower oil. Canola oil is a particularly useful rapeseed oil. The short chain fatty acid ester can be saturated, and can be from four to 10 carbons in length. In particular, the short chain fatty acid ester can be from six to 10 carbons in length. The short chain fatty acid ester can be normal or branched, and can be a methyl ester or a polyol ester, such as a neopentyl glycol ester, a pentaerythritol ester, or a trimethylolpropane ester. Trimethylolpropane triheptanoate is a useful trimethylolpropane ester.

The method further can include adding an amount of an antioxidant effective to increase oxidative stability of the transesterified vegetable oil. The antioxidant can be selected from the group consisting of hindered phenols, dithiophosphates, and sulfurized polyalkenes. The amount of antioxidant can be about 0.001% to about 10% by weight.

The invention also features an oil comprising a first glycerol polyol ester and a second non-glycerol polyol ester, and methods for making such oils. Oils of the invention further can include an antioxidant, an antiwear additive, a pour-point depressant, an antirust additive, or an antifoam additive. The first polyol ester of such oils is characterized by the formula:

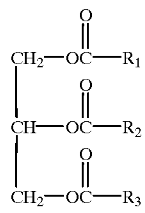

wherein R1, R2, and R3 are independently aliphatic hydrocarbyl moieties having four to 24 carbon atoms, wherein at least one of R1, R2, and R3 have a saturated aliphatic hydrocarbyl moiety having four to 10 carbon atoms, and wherein at least one of R1, R2, and R3 have an aliphatic hydrocarbyl moiety having 12 to 24 carbon atoms. The saturated aliphatic hydrocarbyl moiety can be, for example, a hexyl moiety, a heptyl moiety, or a nonyl moiety. The aliphatic hydrocarbyl moiety having 12 to 24 atoms can be derived from oleic acid, eicosenoic acid, or erucic acid.

The second polyol ester of oils of the invention can be characterized by the formula:

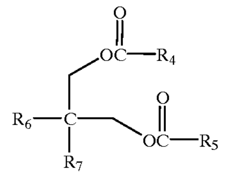

wherein R4 and R5 are independently aliphatic hydrocarbyl moieties having four to 24 carbon atoms, wherein at least one of R4 and R5 have a saturated aliphatic hydrocarbyl moiety having four to 10 carbon atoms, and wherein at least one of R4 and R5 have an aliphatic hydrocarbyl moiety having 12 to 24 carbon atoms, wherein R6 and R7 are independently a hydrogen, an aliphatic hydrocarbyl moiety having one to four carbon atoms, or

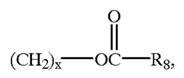

wherein X is an integer of 0 to 6, and wherein R8 is an aliphatic hydrocarbyl moiety having four to 24 carbon atoms. For example, $R_6$ can be an ethyl moiety, and $R_7$ can be

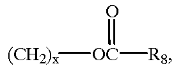

wherein X is 1 and $R_8$ is an aliphatic hydrocarbyl moiety having 4 to 24 carbon atoms.

Unless otherwise defined, all technical and scientific terms used herein have the same meaning as commonly understood by one of ordinary skill in the art to which this invention belongs. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
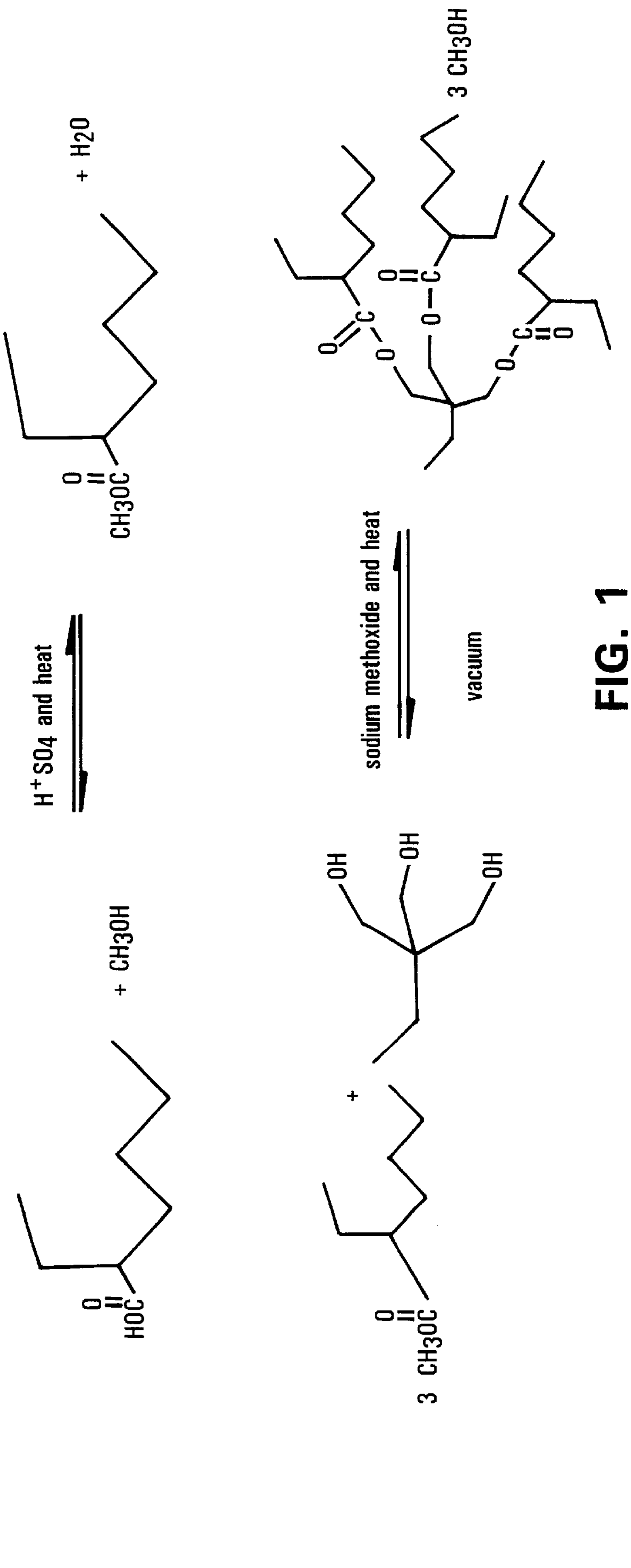
FIG. 1 is a diagram that depicts the synthesis of the methyl ester of 2-ethyl hexanoic acid (A) and the synthesis of TMP-esters (B).

Transesterification of two polyol esters randomizes the distribution of fatty acids among the polyol backbones, resulting in the transesterified products having properties different from each of the original polyol esters. As described herein, transesterifying a TAG containing oil, such as a vegetable oil, with a short chain fatty acid ester improves lubrication properties of the TAG containing oil. As used herein, "lubrication properties" refers to low temperature properties such as viscosity and crystallization temperature, and wear properties, such as low wear and reduced friction of the oil. Transesterified reaction products have the potential for increased oxidative stability due to an increased saturated fatty acid content and improved low temperature properties due to the heterogeneity of the fatty acid chains.

Starting Oils

Suitable starting oils contain TAGs, and can be synthetic or derived from a plant. For example, TAGs such as triolein, trieicosenoin, or trierucin can be used as starting materials. TAGs are available commercially, for example, from Sigma Chemical Company (St. Louis, Mo.), or can be synthesized using standard techniques. Plant derived oils, i.e., vegetable oils, are particularly useful starting materials, as they allow oils of the invention to be produced in a cost-effective manner. Suitable vegetable oils have a monounsaturated fatty acid content of at least about 50%, based on total fatty acid content, and include, for example, rapeseed (Brassica), sunflower (Helianthus), soybean (*Glycine max*), corn (*Zea mays*), crambe (Crambe), and meadowfoam (Limnanthes) oil. Canola oil, which has less than 2% erucic acid, is a useful rapeseed oil. Oils having a monounsaturated fatty acid content of at least 70% are particularly useful. The monounsaturated fatty acid content can be composed of, for example, oleic acid ($C_{18:1}$), eicosenoic acid ($C_{20:1}$), erucic acid ($C_{22:1}$), or combinations thereof.

Oils having an oleic acid content of about 70% to about 90% are particularly useful. For example, IMC-130 canola oil, available from Cargill, Inc., has an oleic acid content of about 75%, and a polyunsaturated fatty acid content ($C_{18:2}$ and $C_{18:3}$) of about 14%. U.S. Pat. No. 5,767,338 describes plants and seeds of IMC 130. See also U.S. Pat. No. 5,861,187. High oleic sunflower oils having oleic acid contents, for example, of about 77% to about 81%, or about 86% to about 92%, can be obtained from A. C. Humko, Memphis, Tenn. U.S. Pat. No. 4,627,192 describes high oleic acid sunflower oils.

Oils having a high eicosenoic acid content include meadowfoam oil. Typically, meadowfoam oil has an eicosenoic acid content of about 60% to about 65%. Such oil is sold by the Fanning Corporation under the trade name "Fancor Meadowfoam".

Oils having a high erucic acid content include high erucic acid rapeseed (HEAR) oil, and crambe oil. HEAR oil has an erucic acid content of about 45% to about 55%, and is commercially available, for example, from CanAmera Foods (Saskatoon, Canada). For example, a high erucic acid rapeseed line that is sold under the trade name Hero is useful. Other high erucic acid varieties such as Venus, Mercury, Neptune or S89-3673 have erucic acid contents of about 50% or greater and also can be used. McVetty, P. B. E. et al., *Can. J. Plant Sci.,* 76(2):341–342 (1996); Scarth, R. et al., *Can. J. Plant Sci.,* 75(1):205–206 (1995); and McVetty, P. B. E. et al., *Can. J. Plant Sci.,* 76(2):343–344 (1996). Crambe oil has an erucic acid content of about 50% to about 55%, and is available from AgGrow Oils LLC, Carrington, N. Dak.

Transesterification

According to the invention, transesterification (i.e., the exchange of an acyl group of one ester with that of another ester) of a vegetable oil with an ester of a short chain fatty acid results in random esterification of the short chain fatty acids to the glycerol backbone of the vegetable oil, generating TAGs having the following structure:

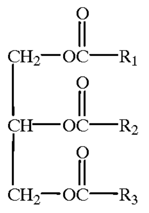

In this structure, R1, R2, and R3 are independently aliphatic hydrocarbyl moieties having about four to about 24 carbon atoms inclusive, wherein at least one of R1, R2, and R3 have a saturated aliphatic hydrocarbyl moiety having four to 10 carbon atoms inclusive, and wherein at least one of R1, R2, and R3 have an aliphatic hydrocarbyl moiety having from 12 to 24 carbon atoms inclusive. As used herein, "hydrocarbyl moiety" refers to aliphatic alkyl and alkenyl groups, including all isomers, normal and branched. Suitable saturated aliphatic hydrocarbyl moieties include butyl, pentyl, hexyl, heptyl, octyl, nonyl, and decyl groups. Alkenyl moieties can have a single double bond such as heptadecenyl, or can have two or three double bonds such as heptadecadienyl and heptadecatrienyl.

Esters of short chain fatty acids include methyl esters and polyol esters. Methyl esters can be produced, for example, by esterification of fatty acids. Typically, the fatty acids are converted to methyl esters with methanol in an acid or base catalyzed reaction. Alternatively, methyl esters are available commercially and can be purchased, for example, from Sigma Chemical Company, St. Louis, Mo., or from Proctor and Gamble, New Milford, Conn. Transesterification of a vegetable oil with short chain methyl esters results in TAG esters of long and short chains. The byproducts of the reaction, methyl esters of long and short chain fatty acids, can be removed, for example, by vacuum distillation.

Polyol esters also can be used in the transesterification of vegetable oils. As used herein, "polyol esters" refers to esters produced from polyols containing from two to about 10 carbon atoms and from two to six hydroxyl groups. Preferably, the polyols contain two to four hydroxyl moieties. Non-limiting examples of polyols include 1,2-propanediol, 1,3-propanediol, 1,2-butanediol, 1,3-butanediol, 2,3-butanediol, 2-ethyl-1,3-propanediol, 2-ethyl-2-butyl-1,3-propanediol, neopentyl glycol, 2,2,4-trimethyl-1,3-pentanediol, trimethylolpropane (TMP), and pentaerythritol. Neopentyl glycol, TMP, and pentaerythritol are particularly useful polyols. Polyol esters are produced by transesterification of a polyol with methyl esters of short chain fatty acids. As used herein, "short chain fatty acid" refers to all isomers of saturated fatty acids having chains of four to ten carbons, including fatty acids containing odd or even numbers of carbon atoms. Short chain fatty acids can include alkyl groups. For example, 2-ethyl hexanoic acid is a useful short chain fatty acid. Suitable TMP esters can include, for example, TMP tri(2-ethyl hexanoate), TMP triheptanoate (TMPTH), TMP tricaprylate, TMP tricaproate, and TMP tri(isononanoate).

Transesterification of a polyol ester with a vegetable oil results in the short fatty acid chains of the polyol, and the long fatty acid chains of the TAG, being randomly distributed among both the polyol and glycerol backbones. In one embodiment, oils of the invention contain TAGs having a structure as defined above, and a non-glycerol polyol ester having the following structure:

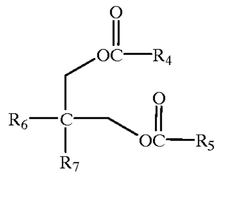

wherein R4 and R5 are independently aliphatic hydrocarbyl moieties having 4 to 24 carbon atoms inclusive, wherein at least one of R4 and R5 have a saturated aliphatic hydrocarbyl moiety, and wherein at least one of R4 and R5 have an aliphatic hydrocarbyl moiety having from 12 to 24 carbon atoms. R6 and R7 are independently hydrogen, an aliphatic hydrocarbyl having one to four carbon atoms, or

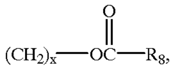

X is an integer of 0 to 6. R8 is an aliphatic hydrocarbyl moiety having 4 to 24 carbon atoms. In particular embodiments, R6 is an ethyl moiety, and R7 is

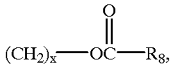

wherein X is 1 and R8 is an aliphatic hydrocarbyl moiety having 4 to 24 carbon atoms.

In general, transesterification can be performed by adding a short chain fatty acid ester to a vegetable oil in the presence of a suitable catalyst and heating the mixture. Typically, the vegetable oil comprises about 5% to about 90% of the reaction mixture by weight. For example, the vegetable oil can be about 10% to about 90%, about 40% to about 90%, or about 60% to about 90% of the mixture. As described herein, short chain fatty acid esters can be about 10% to about 50% of the reaction mixture by weight, and in particular, about 15% to about 30% of the reaction mixture. For example, the short chain fatty acid esters can be about 20% to about 25% of the reaction mixture. Ratios of vegetable oil:short chain fatty acid ester of about 80:20 or about 75:25 yield a high number of TAGs containing a single short chain, and also modify a majority of the TAGs in the vegetable oil.

Non-limiting examples of catalysts include base catalysts, sodium methoxide, acid catalysts including inorganic acids such as sulfuric acid and acidified clays, organic acids such as methane sulfonic acid, benzenesulfonic acid, and toluenesulfonic acid, and acidic resins such as Amberlyst 15. Metals such as sodium and magnesium, and metal hydrides also are useful catalysts. Progress of the reaction can be monitored using standard techniques such as high performance liquid chromatography (HPLC), infrared spectrometry, thin layer chromatography (TLC), Raman spectroscopy, or UV absorption. Upon completion of the reaction, sodium methoxide catalyst can be neutralized, for example, by addition of water or aqueous ammonium chloride. Acid catalysts can be neutralized by a base such as a sodium bicarbonate solution. Deactivated catalyst and soaps can be removed by a water wash, followed by centrifugation. The oil can be dried by addition of anhydrous magnesium sulfate or sodium sulfate. Remaining water can be removed by heating to about 60° C. under vacuum. Methyl esters can be removed by distillation.

Characterization of Transesterified Oils

As described herein, transesterification of short chain fatty acids esters with vegetable oils improves the low temperature lubrication properties of the vegetable oils. Low temperature properties that are of interest include crystallization temperature and viscosity. Crystallization temperature and general melting behavior of the transesterification product can be assessed using differential scanning calorimetry (DSC).

Viscosity of an oil of the invention can be assessed by determining the viscosity index, an arbitrary number that indicates the resistance of a lubricant to viscosity change with temperature. The viscosity index can be readily measured using the American Society for Testing and Materials (ASTM) standard method D2270-91. The viscosity index can also be calculated from observed kinematic viscosities of a lubricant at 40° C. and 100° C. Kinematic viscosity values can be determined by Test Methods D445, IP 71, or ISO 3104.

Viscosity index values typically range from 0 to greater than 200. A higher viscosity index indicates that the oil changes less with a change in temperature. In other words, the higher the viscosity index, the greater the resistance of the lubricant to thicken at low temperatures and thin out at high temperatures. As described herein, viscosities of transesterified products were lower at low temperatures (−5° C.) than a commercial lubricant and IMC 130 canola oil, and similar to commercial lubricants at 40° C. and 100° C. Lower viscosity at low temperatures is a particularly useful property. Viscosity indices ranged from about 190 to about 255 for oils of the invention, which is a desirable range for lubrication applications. For example, transesterification of IMC 130 with TMPTH produced an oil having a viscosity index greater than 240.

Another property of interest is the oxidative stability of an oil. Oxidative stability is related to the degree of unsaturation in the oil, and can be measured, e.g. with an Oxidative Stability Index instrument, Omnion, Inc., Rockland, Mass. according to AOCS Official Method Cd 12b-92 (revised 1993). Oxidative stability is often expressed in terms of "AOM hours". The higher the AOM hours, the greater the oxidative stability of the oil.

When an oil of the invention is made by transesterifying a vegetable oil, the oxidative stability of the transesterified oil is greater than that of the starting vegetable oil, when both are formulated to have the same level of antioxidants. Further improvement in oxidative stability of such a transesterified oil can be expected when loss of tocopherols present in the starting vegetable oil are minimized during the reaction and, in addition, with antioxidant formulation.

Other useful properties of an oil of the invention include lubrication properties and wear characteristics. Coefficients of friction and anti-wear properties can be assessed, for example, by a Four-Ball Wear test or a Micro-Four-Ball wear test. See, Asadauskas, S. et al., *J. Soc. Tribologists Lubrication Engineers,* 52(12):877–882 (1995). A microoxidation test can also be used to evaluate deposits or volatiles formed by a lubricant. For example, a thin-film oxidation test such as the Klaus Penn State Microoxidation Test can be used, which measures evaporation and deposits after about 2–3 hours at about 190° C. See, Cvitkovic, E. et al., *ASLE Transactions,* 22(4):395–401.

Vegetable oils transesterified with TMP esters of 2-ethyl hexanoic acid, isononanoic acid, and heptanoic acid have lower coefficients of friction and better anti-wear properties than the starting vegetable oil or a formulated commercial lubricant, indicating transesterification with short fatty acid chains enhances the lubricity of the starting oil.

Oil Formulations

Oils of the invention can be formulated with one or more additives and used as cost effective, high performance, and readily biodegradable industrial oils, such as high performance hydraulic fluids or engine lubricants. Typically, additives are present in amounts totaling from about 0.001% to about 20% based on weight. For example, a transmission fluid for diesel engines can be made that includes antioxidants, anti-foam additives, anti-wear additives, corrosion inhibitors, dispersants, detergents, and acid neutralizers, or combinations thereof. Hydraulic oil formulations can include antioxidants, anti-rust additives, anti-wear additives, pour point depressants, viscosity-index improvers and anti-foam additives or combinations thereof. Specific oil formulations will vary depending on the end use of the oil; suitability of a specific formulation for a particular use can be assessed using standard techniques.

Typical antioxidants are aromatic amines, phenols, compounds containing sulfur or selenium, dithiophosphates, sulfurized polyalkenes, and tocopherols. Hindered phenols are particularly useful, and include for example, 2,6-di-tert-butyl-p-cresol (DBPC), tert-butyl hydroquinone (TBHQ), cyclohexylphenol, and p-phenylphenol. Example of amine-type antioxidants include phenyl-α-napthylamine, alkylated dephenylamines and unsymmetrical diphenylhydrazine. Zinc dithiophosphates, metal dithiocarbamates, phenol sulfides, metal phenol sulfides, metal salicylates, phosphosulfurized fats and olefins, sulfurized olefins, sulfurized fats and fat derivatives, sulfurized paraffins, sulfurized carboxylic acids, disalieylal-1,2,-propane diamine, 2,4-bis (alkyldithio)-1,3,4-thiadiazoles) and dilauryl selenide are examples of useful antioxidants. Lubrizol product #121056F (Wickliffe, Ohio) provides a mixture of antioxidants that is particularly useful. Antioxidants are typically present in amounts from about 0.001 to about 10 weight %. In particular embodiments, about 0.01% to about 3.0% of an antioxidant is added to an oil of the invention. See U.S. Pat. Nos. 5,451,334 and 5,773,391 for a description of additional antioxidants.

Rust inhibitors protect surfaces against rust and include alkylsuccinic type organic acids and derivatives thereof, alkylthioacetic acids and derivatives thereof, organic amines, organic phosphates, polyhydric alcohols, and sodium and calcium sulphonates. Anti-wear additives adsorb on metal, and provide a film that reduces metal-to-metal contact. In general, anti-wear additives include zinc dialkyldithiophosphates, tricresyl phosphate, didodecyl phosphite, sulfurized sperm oil, sulfurized terpenes and zinc dialkyldithiocarbamate, and are used in amounts from about 0.05 to about 4.5 weight %.

Corrosion inhibitors include dithiophosphates and in particular, zinc dithiophosphates, metal sulfonates, metal phenate sulfides, fatty acids, acid phosphate esters and alkyl succinic acids.

Pour point depressants permit flow of the oil formulation below the pour point of the unmodified lubricant. Common pour point depressants include polymethacrylates, wax alkylated naphthalene polymers, wax alkylated phenol polymers and chlorinated polymers, and generally are present in amounts of about 1% or less. See, for example, U.S. Pat. Nos. 5,451,334 and 5,413,725.

Viscosity index can be increased by adding, for example, polyisobutylenes, polymethacrylates, polyacrylates, vinyl acetates, ethylene propylene copolymers, styrene isoprene copolymers, styrene butadiene copolymers and styrene maleic ester copolymers.

Anti-foam additives reduce or prevent the formation of a stable surface foam and are typically present in amounts from about 0.00003 to about 0.05 weight %. Polymethylsiloxanes, polymethacrylates, salts of alkylene dithiophosphates, amyl acrylate telomer and poly(2-ethylhexylacrylate-co-ethyl acrylate are non-limiting examples of anti-foam additives.

Detergents and dispersants are polar materials that serve a cleaning function. Detergents include metal sulfonates, metal salicylates and metal thiophosponates. Dispersants include polyamine succinimides, hydroxy benzyl polyamines, polyamine succinamides, polyhydroxy succinic esters and polyamine amide imidazolines.

The invention will be further described in the following examples, which do not limit the scope of the invention described in the claims.

EXAMPLES

Example 1—Synthesis of Methyl Esters: Free fatty acids were converted into methyl esters via an acid catalyzed reaction of the free fatty acid and methanol. See FIG. 1A for a description of the synthetic route, using 2-ethyl hexanoic acid (Kyowa Hakko, New York, N.Y.) as an example. Approximately 100 g of fatty acid and 400 g of methanol were placed in a 1000 ml round bottom flask fitted with a reflux condenser. Twenty five g of concentrated sulfuric acid were slowly added to the mixture, which was then refluxed. Small samples (2–4 drops) were taken and applied to the surface of the infra-red spectrometer's ATR cell (Nicollet, Madison, Wis.). The methanol was evaporated using a stream of nitrogen and the IR spectrum was recorded. Reactions were considered complete when the samples did not produce further spectral changes, especially in the 3500–4000 $cm^{-1}$ and 1400–1500 $cm^{-1}$ regions. Typical reaction time was about 1.5 to about 2 hours.

Upon completion of the reaction, the mixture was allowed to cool to room temperature, and about 200 ml of water were added to the reaction mixture. Alternatively, after the reaction is complete, the methanol can be distilled off, and then extracted with hexane. After transfer to a 1000 ml separatory funnel, the reaction mixture was washed with about 400 ml of hexane. The hexane phase, which contains the methyl esters, was set aside after separation of the two phases. The methanol phase was extracted repeatedly with 200 ml of hexane until insignificant amounts of methyl esters were recovered (as determined by taking the IR spectrum of the hexane phase). Generally, a total of 5–6 extractions was performed.

The hexane phases were pooled together in a separatory funnel and washed with about 100 ml of 1% $KHCO_3$ (in water). The aqueous phase was removed, and the hexane phase was rewashed with about 100 ml of deionized water. The deionized water was removed from the separatory funnel and tested with pH paper. The water phase was neutral.

Traces of water were removed by pouring the hexane phase into a 1000 ml Erlenmeyer flask and adding 10 g of magnesium sulfate. After rapidly stirring for 5 minutes, the magnesium sulfate was removed by vacuum filtration. The hexane was evaporated using a rotovap and the methyl esters were weighed and their yield calculated. Yields were typically 90% or more.

Example 2—Synthesis of TMP-esters: A portion of the fatty acid methyl esters described in Example 1 were transesterified to TMP using the following procedure. FIG. 1B provides a schematic of the reaction.

One hundred g of a methyl ester from Example 1 were placed in a 250 ml round bottom flask. Trimethylolpropane (97%, Aldrich, Milwaukee, Wis.) was added in an amount such that the mole ratio of methyl ester groups to hydroxyl groups was about 1:0.75. The solution was heated to 80° C. under a constant stream of nitrogen, and 1 gram of sodium methoxide (30%, Acros, Pittsburgh, Pa.) in methanol was added (the methanol was not evaporated prior to addition). The reaction was monitored by taking the IR spectra of small samples and was judged complete when no further changes were observed in the spectrum (especially the hydroxyl region—3500 $cm^{-1}$).

After completion of the reaction, the mixture was allowed to cool down to room temperature. Catalyst was deactivated by addition of five grams of water and rapidly mixing for 30 seconds. Water and soaps were removed by centrifugation at 7000 rpm for 10 minutes. A second water washing was conducted, and the mixture stirred for 5 minutes. Centrifugation was again used to remove the water phase. The reaction mixture was poured into a clean 250 ml round bottom flask and heated to 100° C. under high vacuum to remove unreacted methyl esters. The material was then purified using silica gel (50 to 100 mesh, Aldrich, Milwaukee, Wis.) column chromatography.

Figure 2A:
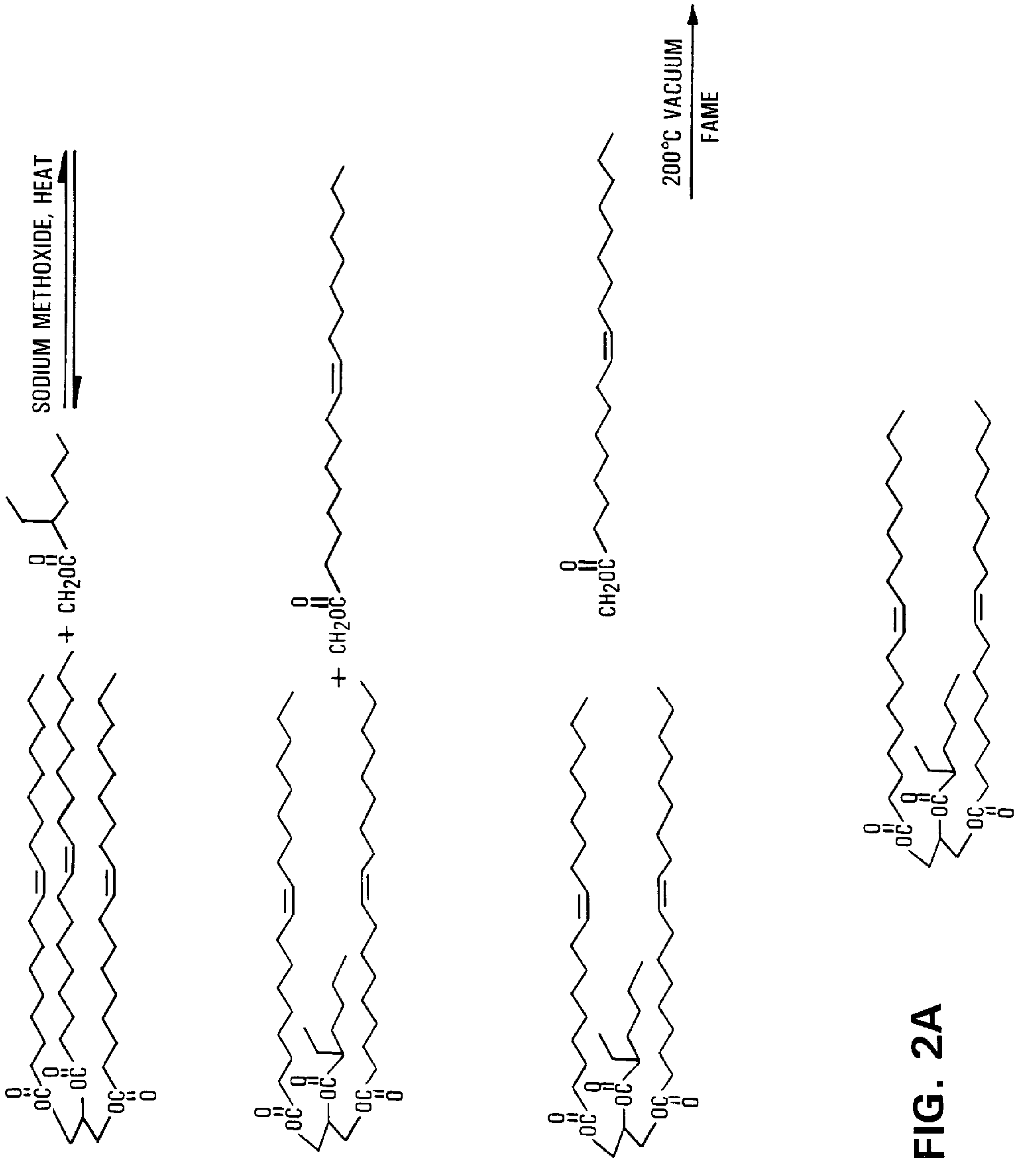
FIG. 2 is a diagram that depicts the transesterification of methyl esters (A) and TMP-esters (B) with IMC-130.
Figure 2B:
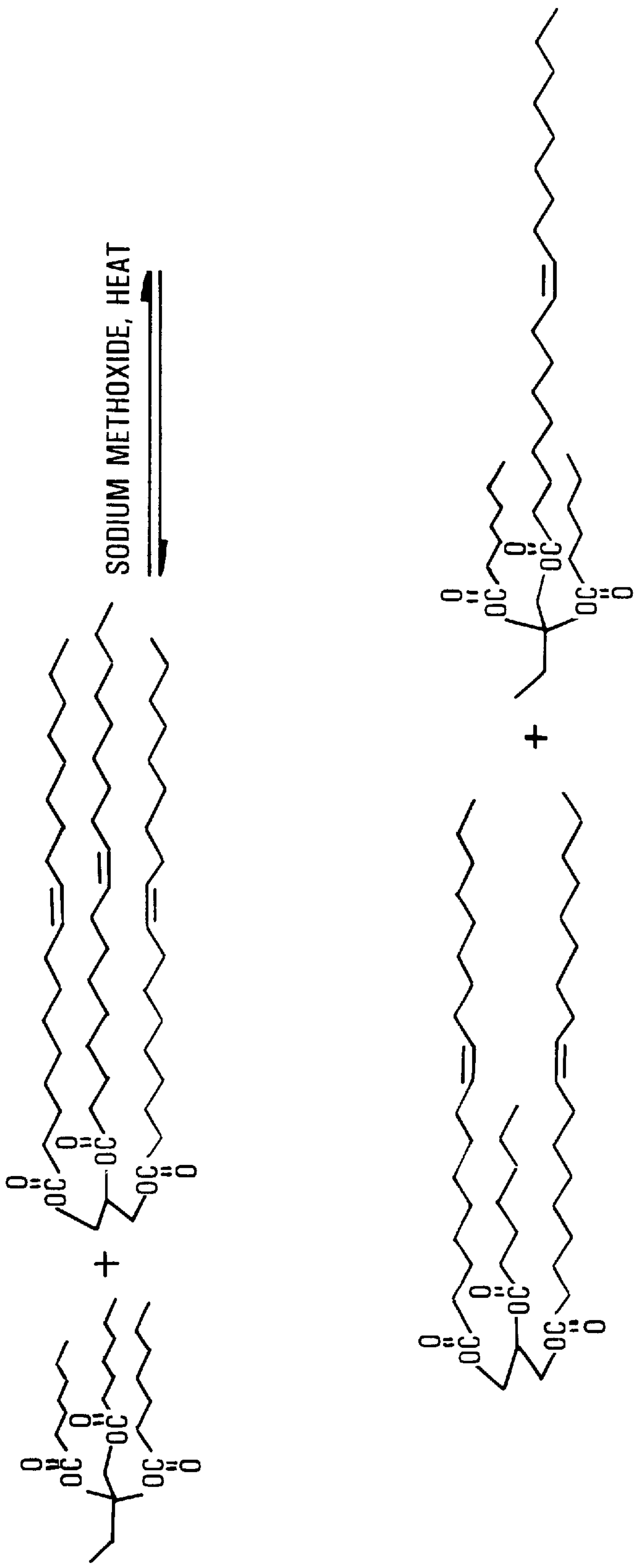

Example 3—General Transesterification Procedure: Short chain fatty acids, in the form of TMP or methyl esters, were transesterified with IMC-130 (Intermountain Canola, Idaho Falls, Id.) using the following procedure. FIG. 2 describes the transesterification of methyl esters (A) and TMP-esters (B) with IMC-130. It should be noted that when the short chain fatty acids were in the form of methyl esters, the long and short chain fatty acid methyl ester byproducts were removed by vacuum distillation after transesterification.

Approximately 80 g of IMC-130 were poured into a 250 ml round bottom flask. To prevent deactivation of the catalyst, the oil was heated to 100° C. under high vacuum to remove traces of moisture. Separately, one g of a 30% sodium methoxide solution (in methanol) was placed into a 20 ml scintillation vial and the methanol was evaporated using a stream of nitrogen gas. Care was taken not to overheat the catalyst, since this can result in decomposition and deactivation. The dried sodium methoxide was gently broken up into a fine powder with a metal spatula. Alternatively, powdered sodium methoxide is commercially available.

Twenty g of the short chain fatty acid ester (methyl or TMP ester) were added to the reaction flask along with the catalyst. If a TMP ester was being used, the temperature was increased to 100° C. under high vacuum. In the case of methyl esters, which were volatile under these conditions, a temperature of 80° C. with a nitrogen atmosphere was used.

After reaching 70°–80° C., the mixture darkened, indicating that transesterification had begun. The reaction was allowed to continue for an additional 30 minutes before being brought back to room temperature. Catalyst was neutralized by adding 5 g of water and stirring rapidly for 30 seconds. Deactivated catalyst and soaps that formed were removed by centrifugation at 7000 rpm for 10 minutes. The oil phase was decanted and washed with 5 g of water for 5 minutes, and then separated using the same centrifugation procedure.

Five g of anhydrous magnesium sulfate were added to the oil phase and rapidly stirred for 5 minutes, then removed by vacuum filtration. The trace amount of water that remained was removed by placing the oil in a flask and heating to 60° C. under high vacuum. If methyl esters were used in the transesterification, remaining methyl esters were removed by using a Kugel-Rohr short path distillation unit (Aldrich, Milwaukee, Wis.). The distillation procedure consisted of slowly heating the oil to 200° C. in a hot air bath, maintaining this temperature for 20 minutes, and collecting the fatty acid methyl esters in a distillate trap.

Figure 3:
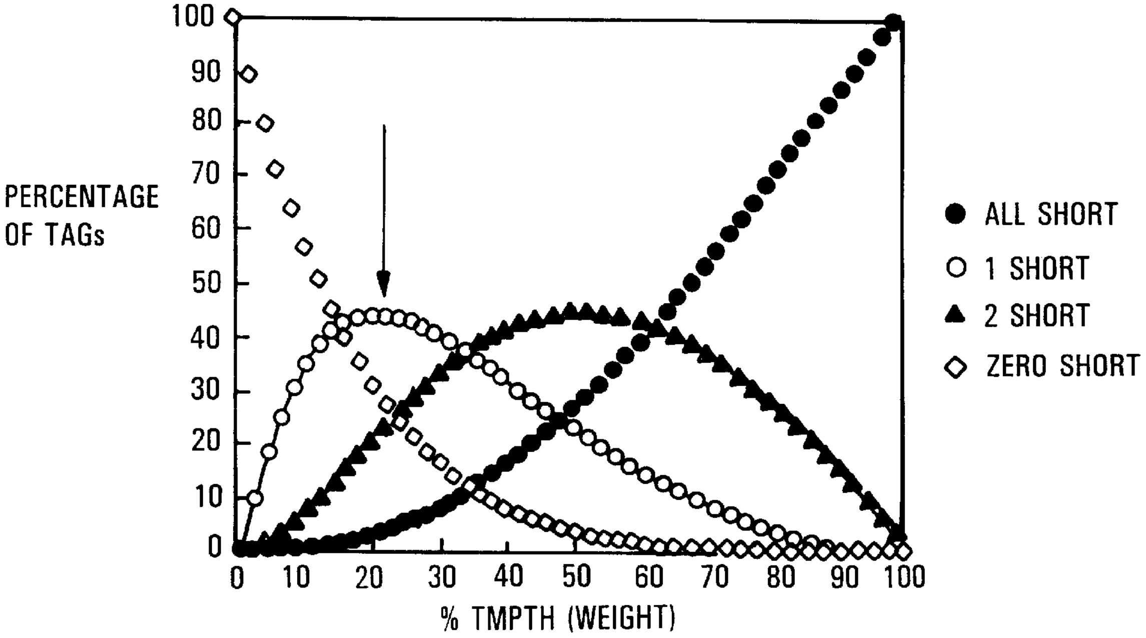
FIG. 3 is a graph of the predicted fatty acid distribution of the TAGs of TMPTH and IMC-130 transesterified products.

Example 4—Transesterification of Vegetable Oils with Short Chain Fatty Acid Esters: A statistical model based on a random distribution was developed to determine how the long chain fatty acids of IMC 130 oil TAGs and the short chain fatty acids of the non-glycerol ester would be distributed when short chain fatty acid esters were transesterified with IMC-130 oil at different concentrations. The model constructed for the transesterification of IMC-130 oil and TMPTH is shown in FIG. 3. Transesterifying about 20–25% TMPTH by weight with IMC-130 oil yields a large number of TAGs with one short chain, and modifies over 70% of the original TAGs found in IMC-130. Although models for short chain fatty acids other than TMPTH differed slightly due to differences in molecular weight, approximately 20–25 wt % yielded a high number of TAGs containing a single short chain, as well as modifying a majority of the TAGs in IMC 130. For this reason, all transesterifications were done using about 20–25% by weight of the short chain fatty acids.

Several types of fatty acids, selected based on their availability, and their expected contribution to low temperature properties and fatty acid esters were obtained. Trimethylolpropane triheptanoate (TMPTH, Inolex, Pittsburgh, Pa., catalog #3I-310) has three fatty acid chains, each containing seven carbon atoms, esterified to TMP. Trimethylolpropane tricaprylate and caproate (TMPTC/c, Inolex, Pittsburgh, Pa., catalog #3N-310) consists of a TMP backbone esterified to fatty acids of eight or ten carbon atoms. C810 Methyl Esters (Proctor and Gamble, New Milford, Conn.) is a mixture of methyl esters of C8:0 and C10:0 fatty acids. C1098 Methyl Esters (Proctor and Gamble, New Milford, Conn.) consists of C10:0 fatty acid methyl esters. Methyl 2-ethyl hexanoate was made by esterifying 2-ethyl hexanoic acid to methanol. Methyl isononanoate was made by esterifying isononanoic acid (Kyowa Hakko, New York, N.Y.) to methanol. Trimethylolpropane tri(2-ethyl hexanoate) was made by transesterifying the corresponding fatty acid methyl ester to TMP. Trimethyolpropane tri (isononanoate) was made by transesterifying the corresponding fatty acid methyl ester to TMP. IMC-130 oil was transesterified with about 20 wt % short chain fatty acid esters. In one reaction, 25% TMPTH and 75% IMC-130 was used.

Transesterification reactions were monitored by HPLC. Reaction samples were washed with a small amount of water to stop the reaction. The water phase was removed by centrifugation, and the oil phase was dried with a small amount of magnesium sulfate. The samples were filtered through a small filter (Gelman Acrodisc, 0.45 $\mu$m) prior to being dissolved in solvent and injected onto the column. The mobile phase consisted of 40% acetonitrile (Fisher, Pittsburgh, Pa.) and 60% acetone, and was pumped (110B Solven Module, Beckman, Palo Altos, Calif.) through a Spherisorb RP-C18 column (Phase Separations, Norwalk, Conn.) at a rate of 1 ml/min. The column was maintained at 40° C. by a column heater (Biorad, Hercules, Calif.), and was monitored using a refractive index detector (Waters, Milford, Mass.) connected to a plotter/integrator (HP-3395 Hewlett-Packard, Santa Clarita, Calif.).

An experiment was conducted to determine the length of time required to achieve complete randomization of fatty acids during transesterification. In this experiment, the transesterification of TMPTH with IMC-130 was monitored by HPLC. A sample was taken of the physical mixture (IMC-130 and TMPTH without catalyst) prior to the start of the reaction. The second sample was taken 5 minutes into the reaction, while the remaining samples were taken at 30 minute intervals.

Figure 4B:
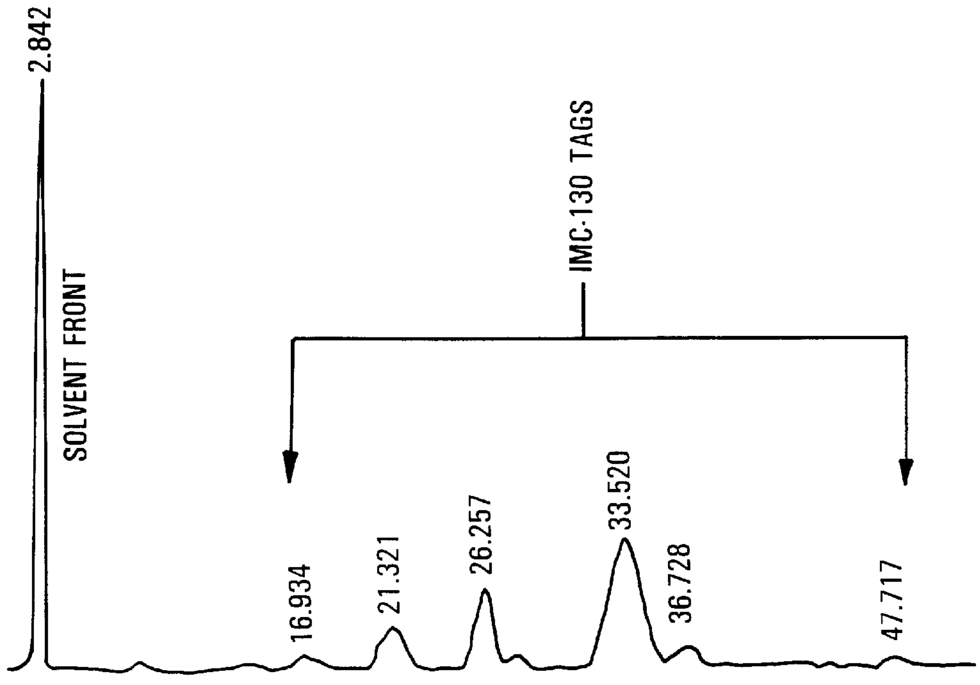
FIGS. 4A and 4B are HPLC chromatograms of TMPTH and IMC-130 triacylglycerol elution, respectively.
Figure 4A:
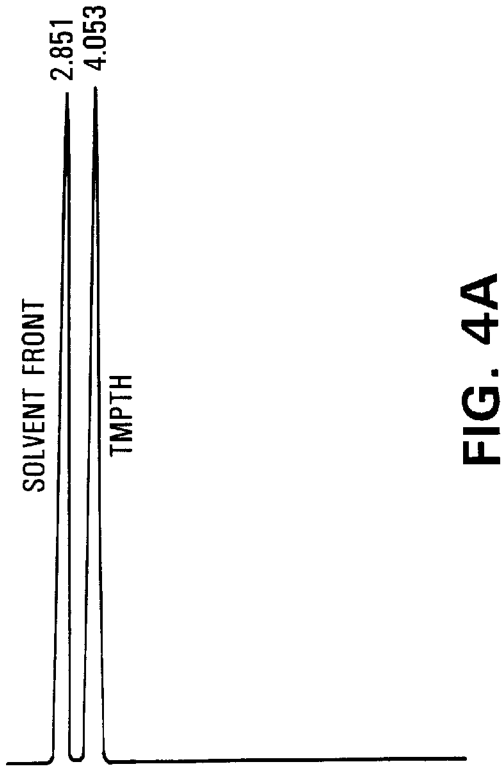
Figure 5A:
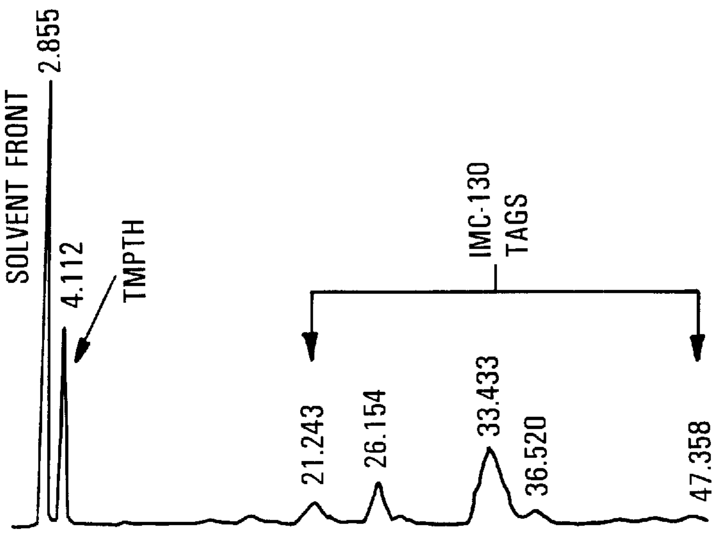
FIGS. 5A, 5B, and 5C are HPLC chromatograms of a transesterification reaction before addition of catalyst (5A), 5 minutes after initiation (5B), and 95 minutes after initiation (5C).
Figure 5B:
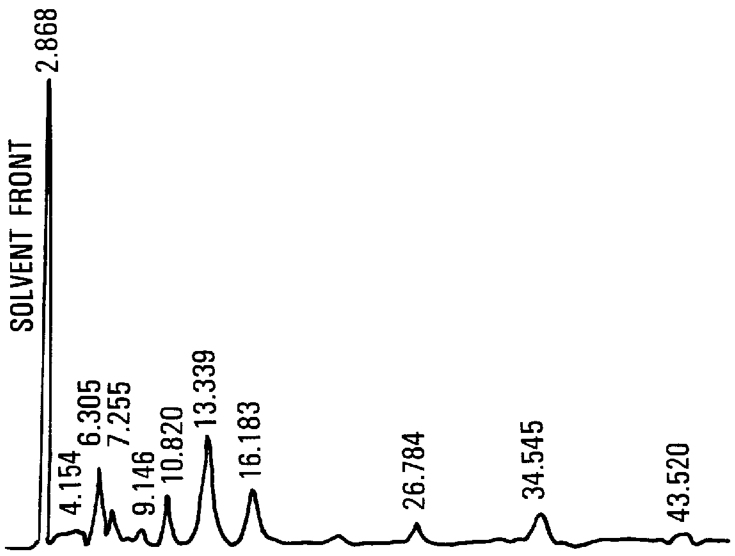
Figure 5C:
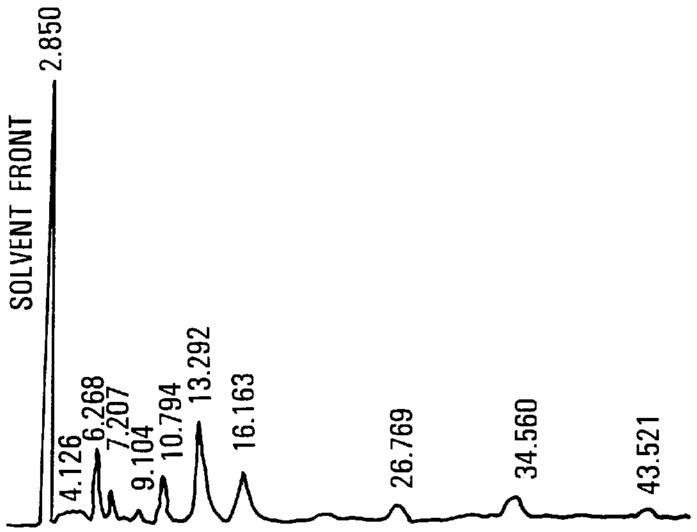

TMPTH eluted 4.1 minutes after being injected and produced only one peak, after the solvent front (see FIG. 4A). IMC-130 produced several peaks due to the presence of a wide range of TAGs, all having elution times greater than that of TMPTH (see FIG. 4B). As shown in FIG. 5, the chromatograms from the samples 5 minutes and 95 minutes after initiation of the transesterification reaction (FIGS. 5B and 5C) were identical, indicating the reaction was complete and randomization had been achieved in about 5 minutes. From the HPLC experiments, it was estimated that a reaction time of about 5 minutes was required to achieve complete randomization, although 30 minutes was used to ensure complete randomization.

Reverse phase thin layer chromatography (TLC) also was used to verify that transesterification had occurred. Glacial acetic acid was used as an eluent and the plate was developed by charring with sulfuric acid. All transesterified products produced the same general pattern of three spots. Spot 3 was closest to the origin, and was produced from triacylpolyols having three long fatty acid chains. The second spot was from triacylpolyols having two long and one short fatty acid chain. The first spot was furthest from the origin, and contained triacylpolyols having one long and two short fatty acid chains. It should be noted that spots with three short chains were not observed, since shorter fatty acids are less responsive to charring.

Example 5—Characterization of Transesterified Oil Products: Oxidative stability was measured as Active Oxygen Method (AOM) hours using the Oxidative Stability Index Official method (OSI) Cd 12b-92. Tocopherols were measured using the AOCS official method Ce 7-87.

Low temperature properties were evaluated with differential scanning calorimetry (DSC), using a Perkin-Elmer (Norwalk, Conn.) differential scanning calorimeter, Model 7. Samples were held at 20° C. for 1 minute, then heated to 75° C. at a rate of 40° C./minute. Samples were held at 75° C. for 10 minutes, then cooled to −40° C. at 1° C./minute. After holding at −40° C. for 20 minutes, samples were heated to 75° C. at 1° C./minute.

Oxidative stability and low temperature properties of transesterified (TE) oils are shown in Table 1. The ratio of oil to short chain fatty acid ester was 80:20 in each of these samples, unless noted otherwise.

TABLE 1

Oxidative Stability and Low Temperature Properties of Transesterified Oils

| Material | Tocopherol[2] | Oxidative Stability[1] No. Added Antioxidants | +3% Lubrizol[3] | +1% TBHQ | Cryst. Temp ° C. | MP ° C. |
|---|---|---|---|---|---|---|
| TMPTO (commercial lubricant) | 0.000 | <1 | 113.00 | 221.57 | −60 | −40 |
| TMPTH (commercial lubricant) | 0.000 | 17.9 | 63.58 | 464 | −60 | −20 |
| IMC-130 starting oil | 0.060 | 38.00 | 51.70 | 382.00 | −36 | −6.6 |
| IMC-130/TMPTH (TE) | 0.023 | 17.90 | 63.58 | 464.00 | −60 | −20 |
| IMC-130/TMPTH (TE) | 0.034 | not done | not done | not done | −60 | −20 |

TABLE 1-continued

Oxidative Stability and Low Temperature Properties of Transesterified Oils

| Material | Tocopherol[2] | Oxidative Stability[1] No. Added Antioxidants | +3% Lubrizol[3] | +1% TBHQ | Cryst. Temp ° C. | MP ° C. |
|---|---|---|---|---|---|---|
| 75:25 IMC-130/TMPTC/c (TE) | 0.025 | 8.70 | 70.24 | 537.00 | −32 | −10 |
| IMC-130/C8 Methyl Ester (TE) | 0.038 | 29.32 | 121.00 | 500+ | −30 | −6 |
| IMC-130/C10 Methyl Ester (TE) | 0.025 | 10.50 | 67.48 | 500+ | −20 | −4 |
| IMC-130/Methyl 2-ethyl hexanoate (TE) | — | 5.57 | 50.52 | — | −32 | 2 |
| IMC-130/Methyl isononanoate (TE) | — | 8.00 | 53.76 | — | −38 | 2 |
| IMC-130/TMP ester 2-ethyl hexanoate (TE) | — | 14.15 | 63.00 | 300+ | −38 | −3.9 |
| IMC-130/TMP ester Isononanoate (TE) | — | 15.14 | 67.60 | 161.00 | −40 | −4.7 |

[1]AOM hours
[2]Tocopherol amount in material
[3]Lubrizol #121056F added at 3% by weight The oxidative stabilities of the transesterified products without added antioxidants were lower than the starting oil, which is thought to be due to the loss of tocopherols from the canola oil during production of the transesterified products. In fact, AOM stabilities of the transesterified products correlated to their tocopherol concentration. Addition of antioxidants to the transesterified oils brought the oxidative stabilities above those of IMC-130 fortified with a similar amount of antioxidant (Table 1). This indicates that the transesterified products are more responsive to antioxidants than vegetable oils. Further improvement in oxidative stability of the transesterified oils can be expected when tocopherol loss is minimized. It is contemplated that routine modification of reaction conditions will minimize tocopherol loss.

Figure 6:
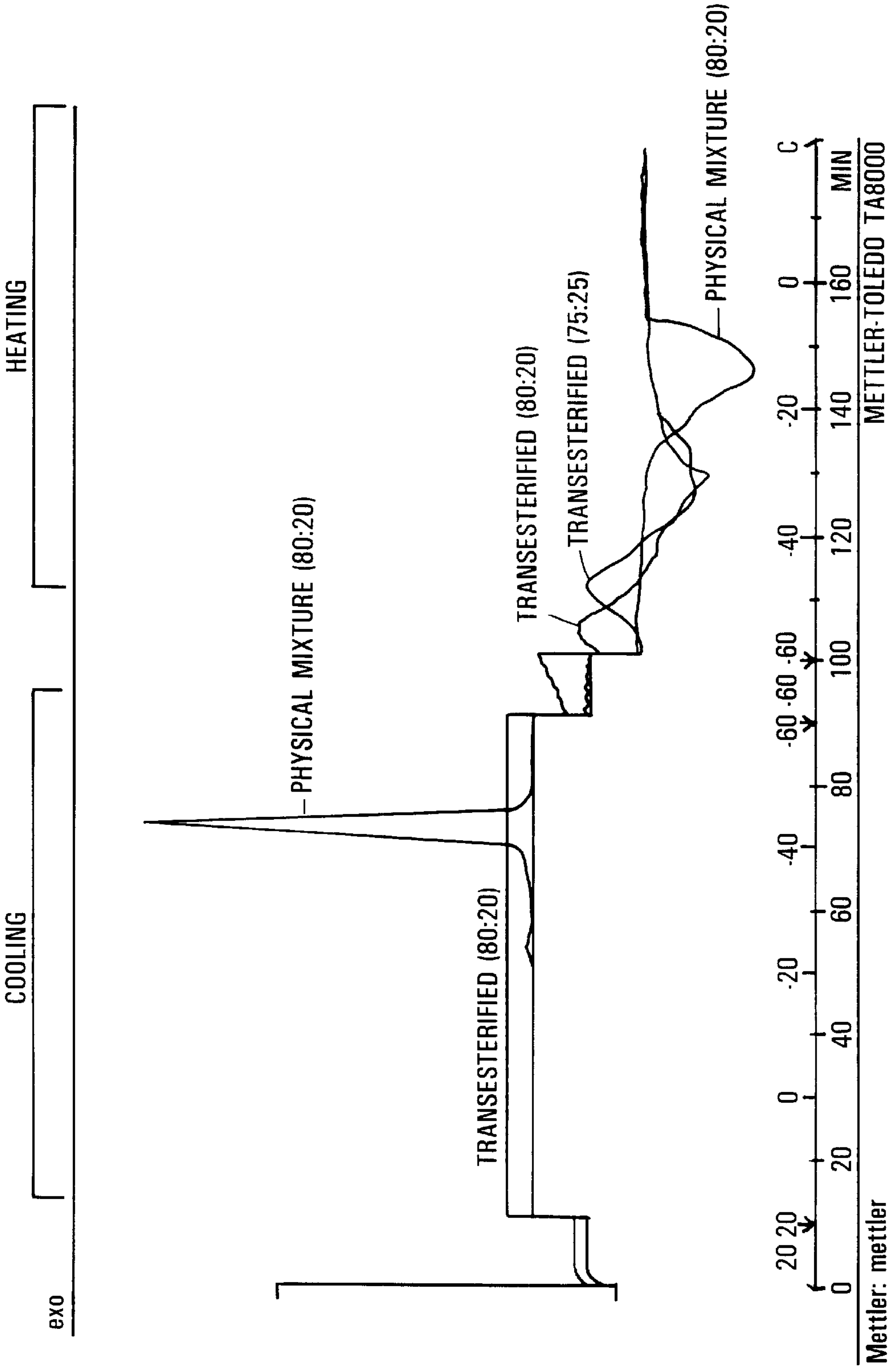
FIG. 6 is a DSC profile of IMC-TMPTH before and after transesterification.

The low temperature properties indicate that, in most cases, transesterification produced improvements in the vegetable oil. Transesterification with TMPTH was notable since it significantly lowered the crystallization melting temperatures of the transesterified oil products as compared with the starting vegetable oil. The DSC profile of the IMC/TMPTH mixture before and after transesterification is shown in FIG. 6.

Viscosity profiles, as a function of temperature, were obtained using a Brookfield viscometer with a small sample adapter. A circulating water bath containing ethylene glycol and water (1:1) was connected to the adapter's jacket to control the temperature of the sample. The sample was cooled to −5° C. and allowed to equilibrate at this temperature for 2–3 minutes. Once equilibrated, the viscosity was recorded. The temperature was increased 5° C. and the process of temperature equilibration and viscosity measurement was repeated every 5° C. until a temperature of 100° C. was reached. Viscosity Index was measured using ASTM official method D2270.

Differences in viscosity were most easily detected at low temperatures. As temperatures were increased, the viscosities of all the transesterified products become similar to IMC-130. The viscosities and viscosity indices of the transesterified (TE) oils are given in Table 2.

TABLE 2

Viscosities of Transesterified Products

| Product | Viscosity at −5° C. | Viscosity at 40° C. | Viscosity at 100° C. | Viscosity Index |
|---|---|---|---|---|
| TMPTO (commercial lubricant) | 440 | 46.1 | 9.3 | 193 |
| TMPTH | — | 14 | 3.4 | 122 |
| IMC-130 only | 330 | 39.5 | 8.3 | 205 |
| IMC-130/TMPTH(TE) 80:20 | 253 | 30.2 | 7.56 | 242 |
| IMC-130/TMPTH 75:25 | 230 | 30 | 7.1 | 250 |
| IMC-130/TMPTC/c (TE) | 260 | 33.6 | 7.3 | 197 |
| IMC-130/C8 Methyl Ester (TE) | 221 | 29 | 6.6 | 203 |
| IMC-130/C10 Methyl Ester (TE) | 265 | 32 | 7 | 198 |
| IMC-130/Methyl 2-ethyl hexanoate (TE) | 434 | 37.4 | 8.3 | 213 |
| IMC-130/Methyl isononanoate (TE) | 335 | 38 | 8 | 204 |
| IMC-130/TMP ester 2-ethyl hexanoate (TE) | 236 | 29.1 | 6.4 | 195 |
| IMC-130/TMP ester Isononanoate (TE) | 266 | 32.1 | 7.05 | 203 |

In addition, micro four-ball tests, which measure friction and wear were conducted. In the micro-four-ball tests at either 10 or 40 kg load, a 30 minute pre-conditioning segment was performed using a 10 ml white oil sample. At the end of this interval, the ball pot was cleaned without moving the balls, and the scar diameters measured. At these loads, wear scars of 0.40±0.02 mm at 10 kg, and 0.50±0.02 mm at 40 kg should be obtained. If the scars did not fall within these limits, the test was voided. This process results in common starting surface area and load.

For the 30 minute test segment, a 6 μl sample of each test oil was carefully added to the scar area of the top (chuck) ball using a hypodermic syringe. The balls were carefully brought in contact with no load, and rotated slightly by hand to distribute the liquid sample. The load then was applied, and the test continued for an additional 30 minutes. All tests were run twice and the average value reported. The test temperature in all tests was 75° C.

Lubrication tests indicated that transesterfying IMC-130 with short chain fatty acids improves both the coefficient of friction (f) and the anti-wear properties (ΔScar). The Δ scar value of mineral oil is usually about 0.2 mm and the coefficient of friction is usually about 0.07. A coefficient of friction less than 0.05 is considered very good. The results for the transesterified products are given in Table 3.

TABLE 3

Mini-four-Ball Test Results

| Sample | ΔScar[1](mm) | Coefficient of Friction[1] (*f*) |
|---|---|---|
| Commercial Lubricant[2] | 0.07 | 0.052 |
| IMC-130 | 0.07 | 0.050 |
| IMC-130/TMPTH | 0.06 | 0.043 |
| IMC-130/TMP-2 Ethyl Hexanoic | 0.04 | 0.038 |
| IMC-130/TMP-Isononanoic | 0.07 | 0.041 |

[1]Results obtained using the micro-4-ball test 40 kg, 75C, 30 min
[2]The commercial ester lubricant is formulated, all other test samples are not Oxidation stability of the fluids was evaluated using the Klaus Penn State Micro-Oxidation Test (PSMO), which measure formation of oxidized deposits and volatiles. The test is a thin-film oxidation test involving only 20 $\mu$l of test fluid. The initial tests were conducted at 190° C. for a period of 3 hours. The test conditions were essentially equivalent to 0.5 hours at 225° C., which is used to screen engine oils for IIID engine tests. Under these conditions, a non-additive containing white oil would exhibit about 25% evaporation and 10% deposit.

To demonstrate the effect of time and temperature in these tests, samples were run in the PSMO at three different conditions (2 hours at 190° C., 1 hour at 200° C. and 0.5 hours at 225° C.). The 200° C. and 225° C. conditions are not as severe as the 190° C. conditions. Based on the results of these three conditions, testing of formulated oils at 190° C. for 2 hours provides a more rigorous assessment of their stability under lubricating conditions.

Results from a PSMO test are described in Table 4. Samples that have lower % volatiles and lower % deposits have a higher resistance towards oxidation. As can be seen in Table 3, transesterified products performed as well as the starting vegetable oils.

TABLE 4

PSMO Oxidation Tests Results

| Sample | % Volatiles[2] | % Deposits[2] |
|---|---|---|
| Commercial Lubricant[3] | 18.6 | 60.9 |
| IMC-130 | 27.4 | 69.8 |
| IMC/TMPTH | 21.8 | 73.2 |
| IMC/TMP-2 Ethyl Hexanoic | 23 | 74.6 |
| IMC/Isononanoic | 26.9 | 68.1 |

[2]Results obtained using the Klaus Penn State Micro-oxidation (PSMO) test @ 190° C. for 3 hours.
[3]The commercial ester lubricant is formulated with antioxidants. All other samples contain no additives.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for improving lubrication properties of a vegetable oil comprising transesterifying said vegetable oil with a short chain fatty acid ester, wherein said short chain fatty acid ester is a polyol ester.

2. The method of claim 1, wherein said vegetable oil is selected from the group consisting of corn oil, rapeseed oil, soybean oil, and sunflower oil.

3. The method of claim 2, wherein said rapeseed oil is canola oil.

4. The method of claim 1, wherein said vegetable oil has a monounsaturated fatty acid content of at least 50%.

5. The method of claim 1, wherein said vegetable oil has a monounsaturated fatty acid content of at least 70%.

6. The method of claim 1, wherein said short chain fatty acid ester is saturated.

7. The method of claim 1, wherein said short chain fatty acid ester is from four to 10 carbons in length.

8. The method of claim 7, wherein said short chain fatty acid ester is from six to 10 carbons in length.

9. The method of claim 1, wherein said short chain fatty acid ester is branched.

10. The method of claim 1, wherein said short chain fatty acid ester is a trimethylolpropane ester.

11. The method of claim 1, wherein said short chain fatty acid ester is trimethylolpropane triheptanoate.

12. The method of claim 1, wherein said short chain fatty acid ester is a neopentyl glycol ester.

13. The method of claim 1, wherein said short chain fatty acid ester is a pentaerythritol ester.

14. The method of claim 1, said method further comprising adding an amount of an antioxidant effective to increase oxidative stability of said transesterified vegetable oil.

15. The method of claim 14, wherein said antioxidant is selected from the group consisting of hindered phenols, dithiophosphates, and sulfurized polyalkenes.

16. The method of claim 15, wherein said amount of antioxidant comprises about 0.001% to about 10% by weight.

17. The method of claim 1, wherein said lubrication properties are selected from the group consisting of wear properties, viscosity, and crystallization temperature.

18. An oil comprising a first glycerol polyol ester and a second non-glycerol polyol ester, wherein said first polyol ester is characterized by the formula:

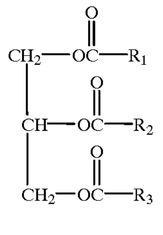

wherein R1, R2, and R3 are independently aliphatic hydrocarbyl moieties having three to 23 carbon atoms, wherein at least one of R1, R2, and R3 have a saturated aliphatic hydrocarbyl moiety having three to nine carbon atoms, and wherein at least one of R1, R2, and R3 have an aliphatic hydrocarbyl moiety having 11 to 23 carbon atoms, and wherein said second polyol ester is characterized by the formula:

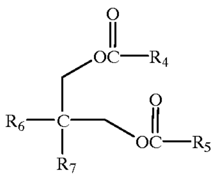

wherein R4 and R5 are independently aliphatic hydrocarbyl moieties having three to 23 carbon atoms, wherein at least one of R4 and R5 have a saturated aliphatic hydrocarbyl moiety having three to nine carbon atoms, and wherein at least one of R4 and R5 have an aliphatic hydrocarbyl moiety having 11 to 23 carbon atoms, wherein R6 and R7 are independently a hydrogen, an aliphatic hydrocarbyl moiety having one to four carbon atoms, or

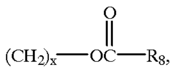

wherein X is an integer of 0 to 6, and wherein R8 is an aliphatic hydrocarbyl moiety having three to 23 carbon atoms.

19. The oil of claim 18, wherein said saturated aliphatic hydrocarbyl moiety is a heptyl moiety.

20. The oil of claim 18, wherein said saturated aliphatic hydrocarbyl moiety is a nonyl moiety.

21. The oil of claim 18, wherein said aliphatic hydrocarbyl moiety having 11 to 23 carbon atoms is derived from a fatty acid selected from the group consisting of oleic acid, eicosenoic acid, and erucic acid.

22. The oil of claim 18, wherein $R_6$ is an ethyl moiety, and $R_7$ is

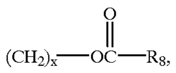

wherein X is 1 and $R_8$ is an aliphatic hydrocarbyl moiety having three to 23 carbon atoms.

23. The oil of claim 18, wherein said saturated aliphatic hydrocarbyl moiety is a hexyl moiety.

24. The oil of claim 18, wherein said saturated aliphatic hydrocarbyl moiety is a heptyl moiety.

25. The oil of claim 18, wherein said saturated aliphatic hydrocarbyl moiety is a nonyl moiety.

26. The oil of claim 18, said oil further comprising an antioxidant.

27. The oil of claim 18, said oil further comprising an antiwear additive.

28. The oil of claim 18, said oil further comprising a pour-point depressant.

29. The oil of claim 18, said oil further comprising an antirust additive.

30. The oil of claim 18, oil further comprising an antifoam additive.

31. A method of producing a transesterified oil comprising transesterifying a triacylglycerol containing oil with a non-glycerol polyol ester, to produce said transesterified oil, wherein said transesterified oil comprises a first glycerol polyol ester and a second non-glycerol polyol ester, said first polyol ester characterized by the formula:

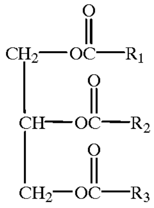

wherein R1, R2, and R3 are independently aliphatic hydrocarbyl moieties having three to 23 carbon atoms, wherein at least one of R1, R2, and R3 have a saturated aliphatic hydrocarbyl moiety having three to nine carbon atoms, and wherein at least one of R1, R2, and R3 have an aliphatic hydrocarbyl moiety having 11 to 23 carbon atoms, and wherein said second polyol ester is characterized by the formula:

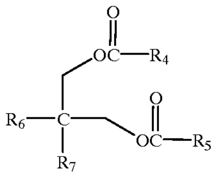

wherein R4 and R5 are independently aliphatic hydrocarbyl moieties having three to 23 carbon atoms, wherein at least one of R4 and R5 have a saturated aliphatic hydrocarbyl moiety having three to nine carbon atoms, and wherein at least one of R4 and R5 have an aliphatic hydrocarbyl moiety having 11 to 23 carbon atoms, wherein R6 and R7 are independently a hydrogen, an aliphatic hydrocarbyl having one to four carbon atoms, or

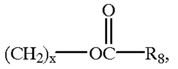

wherein X is an integer of 0 to 6, and R8 is an aliphatic hydrocarbyl moiety having three to 23 carbon atoms.

32. The method of claim 31, wherein said triacylglycerol containing oil is a vegetable oil.

33. The method of claim 32, wherein said vegetable oil has a monounsaturated fatty acid content of at least 70%.

* * * * *